United States Patent [19]

Mendenhall

[11] Patent Number: 5,035,915

[45] Date of Patent: Jul. 30, 1991

[54] HELICAL SPLIT RING FRENCH FRY

[76] Inventor: George A. Mendenhall, 4252 S. Eagleson Rd., Boise, Id. 83705

[21] Appl. No.: 549,127

[22] Filed: Jul. 6, 1990

Related U.S. Application Data

[62] Division of Ser. No. 472,714, Jan. 31, 1990, Pat. No. 5,010,796.

[51] Int. Cl.[5] .......... A23L 1/217

[52] U.S. Cl. .......... 426/637

[58] Field of Search .......... 426/104, 615, 637, 499, 426/514; D1/120, 125, 126, 127, 199

[56] References Cited

U.S. PATENT DOCUMENTS

| | | | |
|---|---|---|---|
| D. 203,807 | 2/1966 | Pellegrino | D1/120 |
| 2,826,229 | 3/1958 | Necula . | |
| 3,057,386 | 10/1962 | Massaro . | |
| 3,952,621 | 4/1976 | Chambos | 83/733 |
| 4,228,963 | 10/1980 | Yamauchi | 241/92 |
| 4,387,111 | 6/1983 | Mullender | 426/637 X |
| 4,447,459 | 5/1984 | Balboni et al. | 426/637 X |
| 4,926,726 | 5/1990 | Julian | 83/165 |
| 4,979,418 | 12/1990 | Covert et al. | 83/865 |

*Primary Examiner*—Arthur L. Corbin

*Attorney, Agent, or Firm*—Frank J. Dykas; Craig M. Korfanta

[57] ABSTRACT

A cut food piece formed in the shape of a helical split ring (10) by means of first cutting a slot in the whole food product by slot cutter (30) prior to urging the whole food product into engagement with cutter blade assembly (20) having wheel plate (21) rotating about central axis (23). Said cutter blade assembly (20) has a plurality of ring cutters (24) attached to and extending normally out from wheel plate (21) for cutting continuous concentric helical spirals in the whole food product. Shear blade (25) extends angularly out from wheel plate (21) for cutting concentric helical rings of food product off the whole food product.

1 Claim, 5 Drawing Sheets

HELICAL SPLIT RING FRENCH FRY

This application is a continuation of application Ser. No. 07/472,714, filed Jan. 31, 1990, now U.S. Pat. No. 5,010,796.

BACKGROUND OF THE INVENTION

1. Technical Field

This invention generally relates to a new helical split ring food product shape and a method and apparatus for making the same. More particularly, it relates to a helical split ring french fry and a potato cutting apparatus which notches a potato along its longitudinal axis immediately before the potato is fed into a helical ring cutter blade assembly.

2. Background Art

The traditional American french fry is a well accepted food and method of serving potatoes both here in the United States and in Western Europe. Indeed, it is rapidly gaining wide acceptance around the world. As a result, a large industry has grown up around the french fry, starting with sophisticated horticultural practices, through crop storage, to processing whole potatoes into frozen french fries, and finally, to supermarkets, restaurants and fast food chains. This industry is, of course, consumer driven. It is the consuming population that generates the demand and growth within the industry.

The typical configuration for the standard french fry has, in general terms, been dictated by the shape of the potato. The most desireable types of potatoes used for processing into french fries are the varieties that produce the largest tuber potato. For example, and for purposes of illustration throughout this specification, the Russet Burbank potato variety commonly grown in the state of Idaho and the eastern regions of the states of Washington and Oregon will be used as an example. This potato is generally oblong in shape and, for french fry processing, has a minimum size of approximately three inches in length by two inches in width. As a result, it can be generally described as having a longitudinal axis running through its center along its length and a shorter transverse axis passing through the center point of the potato at its widest point.

For processing of the standard french fries, the potato is cut along and parallel to its longitudinal axis in generally rectangular configurations to produce long french fry pieces preferably of uniform cross sectional area. It is important that the french fries be of relatively uniform cross sectional area because they are bulk processed and cooked.

The typical french fry processing operation involves peeling the whole potatoes and then passing them either through mechanical or hydraulically driven potato cutters wherein the raw, whole potato is cut into french fry pieces. These cut food pieces are then blanched to break down certain enzymes and par fried in preparation for freezing. Typically blast freezers are used to quick freeze the cut, blanched and par fried french fry pieces prior to packaging.

Because of the volumes of french fry pieces being processed in any given processing plant, the cross sectional area, and more importantly the uniformity of cross sectional area, and how the cut french fry pieces tangle together are particularly important factors in the blanching, par frying and freezing process. Ideally, the cut french fry pieces will be of uniform cross sectional area, and not tangled too much together so as to lay against one another and form large mass areas which would require additional processing time for blanching, par frying and freezing. After they are cut, they are grade inspected for removal of nonuniform pieces and below grade quality. Again, as with the other processing steps, grading for both quality and size of cut food pieces is most easily accomplished when the cut food pieces are not tangled, interlocked or interwoven together.

As it relates to the end use of the french fries, the same or very similar factors are considered. In restaurants, particularly fast food restaurants, it is very important that the cut french fry pieces not be interlocked together since it is important to be able to package uniformly sized serving portions. And, as in the case with the blanching, par frying and blast freezing process, cooking is usually done in bulk and for that reason, if the potatoes are of uniform cross sectional area and size, as a general rule they will cook at the same rate. If on the other hand they are of nonuniform size, then the smaller pieces will be more thoroughly cooked, and perhaps overcooked long before the larger pieces are ready for consumption. Again, as with blanching, par frying and freeze drying, if the cut food pieces are interwoven or interlocked together, they form greater, localized masses where two pieces of potato are locked together, which effects the cooking.

Given all of these processing and cooking considerations, it must still be kept in mind that the industry is consumer demand driven. There is a constant and continuing demand for new shaped french fry cuts. As a result, efforts have been made to develop novel shaped french fries such as french fries formed in the shape of fish, or the letter M, or a variety of other geometric shapes as shown in my U.S. Pat. No. 4,911,045. While decorative cut french fries can and are produced using these processes, it increases the costs of processing since it is a two stage process. First, the core of the potato must be cut into a decorative shape, then, secondly, in an independent cutting process, the core must be cross sliced to form french fry size pieces.

One shape, developed a number of years ago, has found popular acceptance with the consuming public, but presents a dearth of problems for the processor and restauranteur, is the helical spiral french fry commonly known as the curly-Q or curly french fry. These helical spirals of french fry pieces are cut mechanically by a process of engaging the potato, end on, into a rotating cutter blade assembly having a plurality of ring cutters extending normally out from the blade and a sheer blade similar to the cutter blade assembly shown in FIG. 3. As the potato is pushed continuously into engagement with the rotating cutter blade, the ring cutters continuously dig into and cut concentric rings in the potato pulp. These concentric rings are then sheered from the body of the potato by the sheer blade and pass through a hole in the cutter blade assembly to the other side. This results in the formation of helical spirals of cut potato pieces of varying diameters which are, in a large part concentrically intertwined, one within the other. The major difference between the cutter blade assembly shown in FIG. 3 and a helical spiral cutter is caused by the need for some mechanism to keep the potato from rotating with the cutter blade assembly as soon as ring cutters and the sheer blade engage the body of the potato. Typically this is achieved by use of an auger like drill extending out from the central axis of the cutter blade which continuously drills into the body of the potato as it is being fed into the cutter blade assembly.

In a second prior art embodiment, the blades are held stationary and the potato is simultaneously rotated and forced into engagement with the stationary blades.

As far as the french fry processors are concerned, this helical spiral french fry cut is one of the most difficult cuts to produce in that the raw cut food pieces are concentrically intertwined together, making grading, sorting and packaging difficult, blanching and par frying longer processes, and blast freezing more expensive. For the restauranteur, since the cut food pieces are intertwined together, the cut french fry pieces are in contact with each other at numerous points along the spiral lengths, which results in large point source masses which are undercooked in the bulk frying process. Additionally, since the pieces are intertwined, achieving uniform portion size and prepared food plate presentation are made more difficult. As a general rule, it can be said that our consuming public likes the helical spiral french fry, processors and the restauranteurs do not.

Accordingly, what is needed, is a circular or spiral cut french fry piece which does not concentrically intertwine, one with the other so that it has grading, blanching, par frying and blast freezing characteristics similar, and ideally, identical to the standard straight rectangular french fry.

A second object of this invention is to provide a cutting apparatus which can cut spiral ring shaped french fry pieces in a single cutting process. Thus, eliminating the requirement for a second cutting stage wherein a potato core is cross sliced.

SUMMARY OF THE INVENTION

These objects are achieved by production of a helical split ring cut food piece which is cut by use of a cutting blade apparatus wherein a slot is sliced along the longitudinal axis of the whole food product prior to the food product being forced into engagement with a helical spiral cutter blade assembly.

The whole potato is first deposited upon and aligned along its longitudinal axis in a moving conveyor trough formed of two moving conveyor belts formed in the shape of a V. Alignment is achieved by use of either a plurality of spring loaded rollers atop the V shaped conveyor trough or a spring loaded top conveyor belt which force the potatoes down into and against the V shaped conveyor belts in general alignment along their longitudinal axis. The potatoes so held, are then passed atop a rotating slot cutter which slices a slot along the longitudinal axis of the potato up to the center longitudinal axis of the potato. The whole, slotted potato, is then urged forward onto an alignment plate which interfits into the slot and holds the whole potato in alignment with the central axis of a rotating cutter blade.

The potato is then urged into engagement with a cutter blade assembly. The cutter blade assembly being a rotating wheel plate having a planar surface. Attached to, and extending out normally from, the planar surface are a plurality of concentric ring cutting blades which continuously cut concentric rings into the pulp of the potato. A sheer blade, angularly mounted and extending out from the planar surface of the wheel plate, then sheers the concentric rings off the potato as the wheel plate rotates about its axis. The helical split rings sheered by the sheer blade then pass through a transport hole formed in the wheel plate into a central opening of a rotating hub to which the cutter blade assembly is attached.

Without the slot, the cutter blade assembly would cut continuous helical spirals. However, as the sheer blade passes the slot, the helical spiral is terminated, and as a result, helical split ring french fry pieces are formed.

Since the width of the slot is much narrower relative to the cross sectional area of the split ring pieces, the end product is a plurality of concentrically sized ring shaped french fries having a slight helical bend to them and thus, have mechanical handling characteristics similar to that of a box full of flat washers. Smaller concentric rings may fit within larger ones, but they do not intertwine or interlock.

BEST MODE FOR CARRYING OUT THE INVENTION

Figure 1:
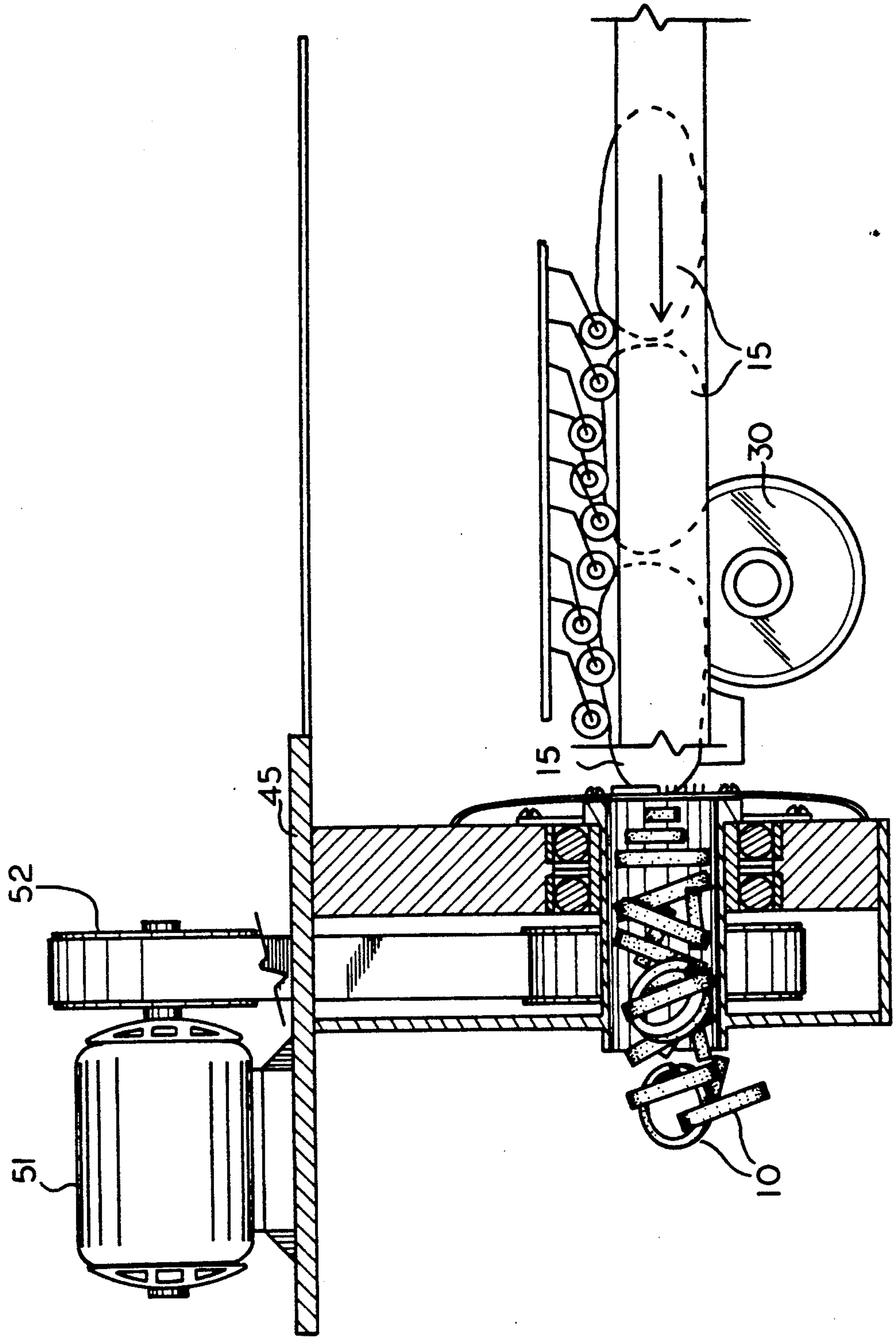
FIG. 1 is a representational sectional side view of the helical split ring cutter assembly.
Figure 3:
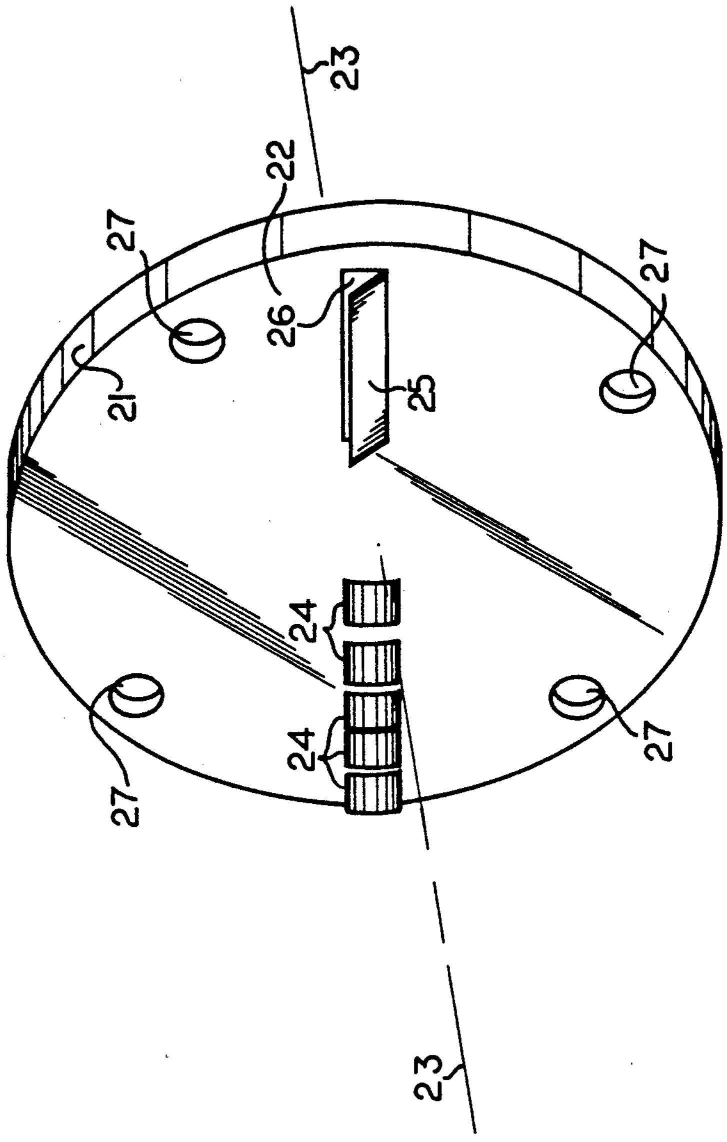
FIG. 3 is a perspective representational view of the cutter blade assembly.

Referring to FIGS. 1, 2, 3, and 4, the helical split ring french fry 10 is shown and the apparatus by which it is made is shown conceptually. Cutter blade 20 is formed of wheel plate 21 having front planar surface 22. The wheel plate 21 rotates about central axis 23.

Attached to and extending normally out from wheel plate 21 and planar surface 22 are ring cutters 24 designed to cut concentric rings into the body of the potato. Sheer blade 25 is mounted opposite ring cutters 24 and is designed to sheer off concentric rings of cut potato pieces as wheel plate 21 rotates about central axis 23. The concentric pieces cut from the potato, are forced, as they are sheered from potato 15, through transport hole 26 into central opening 41 in central hub 40.

Figure 5:
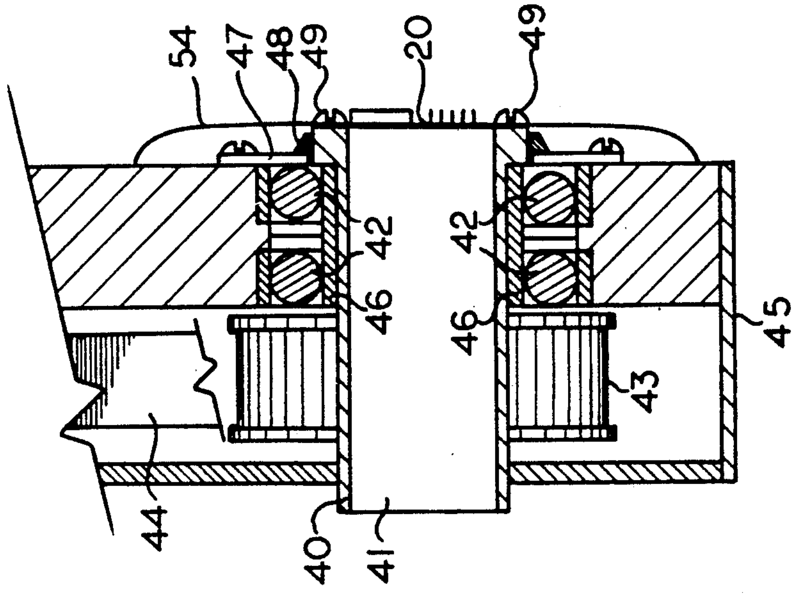
FIG. 5 is a perspective sectional representational side view of the cutter blade assembly.

As can be seen in FIGS. 1 and 5, cutter blade assembly 20 is mounted by means of bolts 49 passing through belt holes 27 to central hub 40. Also extending radially out from cutter blade 20 is water sling plate 54 which protects the seal assembly found at the interface between cutter head assembly 20 and hub containment housing 45.

The mechanical configurations used for driving the conveyor belts and powering rotating cutting blades are well known and play no part of the present invention. For purposes of simplicity in the present description, only that portion of the mechanical assembly that concerns rotating hub 40 is shown and described. In general terms, the rotating hub unit is designed to be held in one containment housing 45, thus providing for simple and easy removal of hub 40 and the cutter head assembly 20 for purposes of daily maintenance and cleaning.

Hub 40, as shown in FIGS. 1 and 5, is supported for rotation within containment housing 45 by means of ball bearing assemblies 42. Hub 40 is provided with central opening 41 which provides a discharge means for cut food pieces 10 exiting cutter assembly 20 through transport hole 26. Rotational drive for hub 40 and cutter head assembly 20 is provided by means of electric motor 51, drive sprocket 52, drive belt 44 and hub sprocket 43.

As with any food processing equipment, care must be taken so that oil and other lubricants for the mechanical equipment do not contaminate the food cutting surfaces. In this regard, seal ring 48 held by circular holding ring 53 attached to seal ring plate 47 is provided to prevent lubricants from contaminating cutter blade assembly 20 and the interior surfaces of hub 40 which come in regular contact with food product. Additional protection for seal ring 48 is provided by sling plate 54 which extends out from the rotating cutter head assembly 20 to provide a carrier for splashing water and fluids as the potatoes are being cut.

Figure 2:
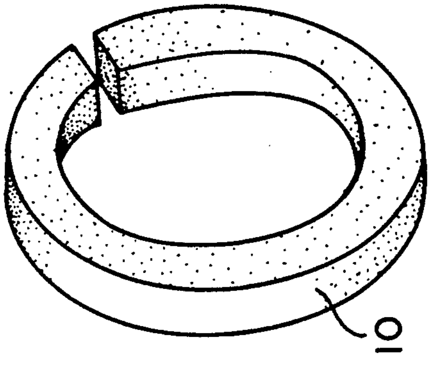
FIG. 2 is a perspective representational view of a helical split ring cut food piece.
Figure 4:
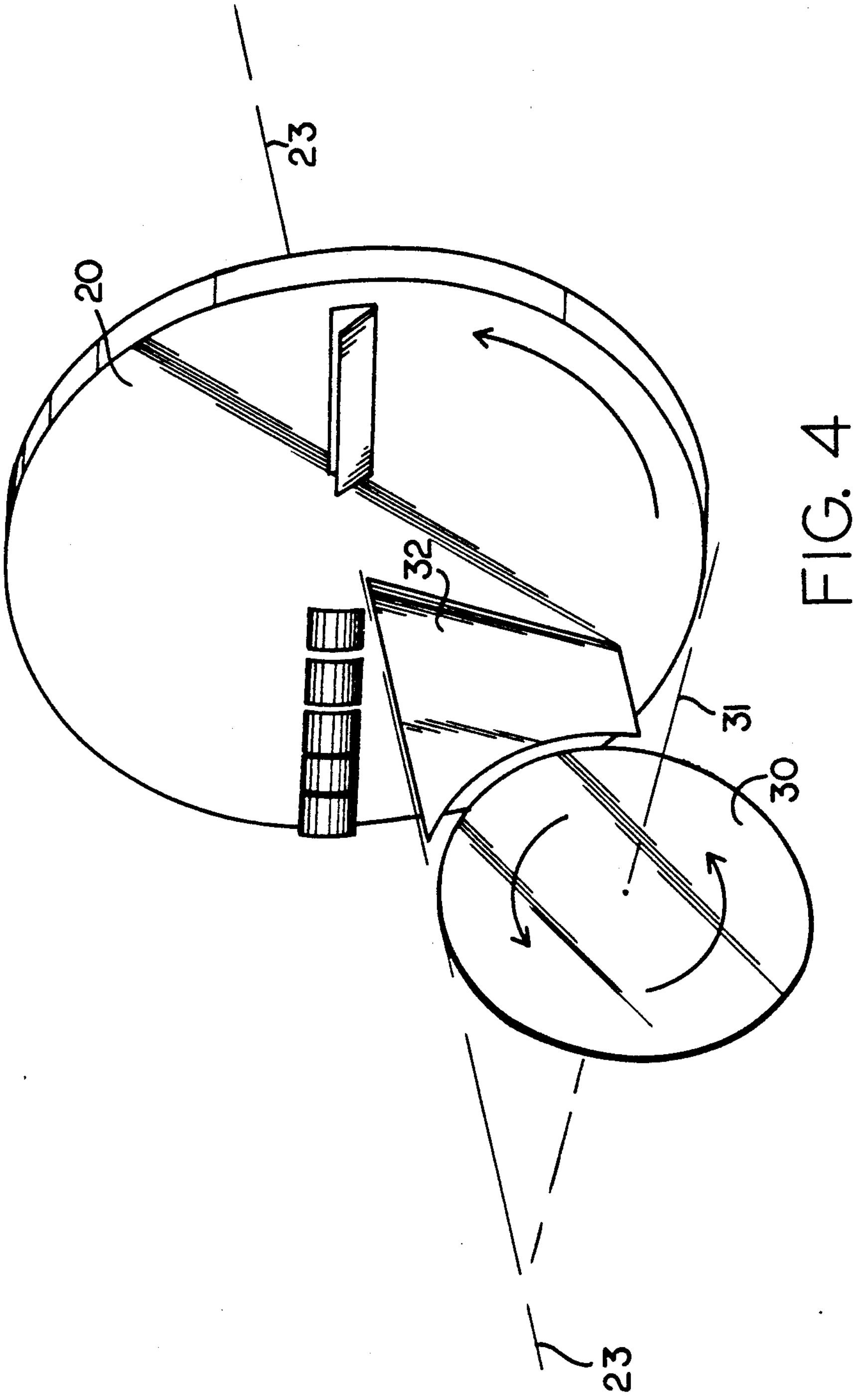
FIG. 4 is a perspective representational view of the relative orientation of the slotting blade, alignment plate and cutter blade assembly.

In order to achieve the helical split ring french fry piece 10, as shown in FIGS. 1 and 2, slotting blade 30 is provided for rotation about notch blade axis 31 as shown in FIG. 4. Slotting blade 30 is positioned such that the uppermost tangent of splitting notch blade 30 is coincident to central axis 23 of cutter blade assembly 20. In this manner, as potatoes are fed with the longitudinal axis aligned coincident to central axis 23 of cutter blade assembly 20 into engagement with slotting blade 30, a slot is sliced into the potato along and up to the central longitudinal axis of the potato to be cut. The potato is then transported forward with alignment plate 32 sliding into the longitudinal notch cut in the potato and then into cutting engagement with cutter blade assembly 20.

Figure 6:
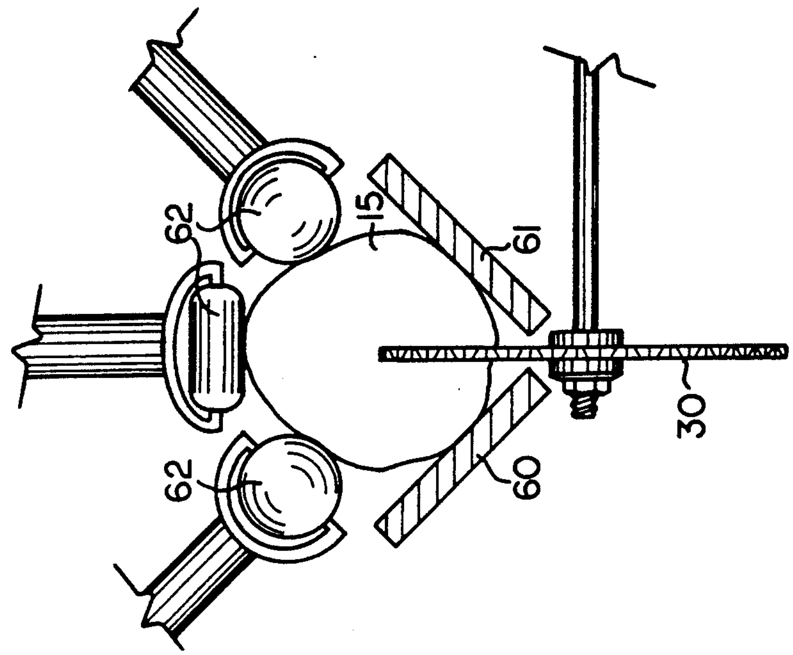
FIG. 6 is a perspective representational sectional end view of a first embodiment of the conveyor assembly and slot cutter blade.

Referring to FIGS. 1, 5, and 6, it can be seen that potatoes to be cut are first deposited onto a pair of opposing conveyor belts 60 and 61, which together form a V shaped conveyor trough. Given the generally oblong configuration of the potatoes 15, they fall into longitudinal alignment with the V shaped conveyor trough and are transported into engagement with rotating slot cutter 30. As shown in FIGS. 1 and 6, potatoes 15 are urged downward against and held in place against opposing conveyor belts 60 and 61 by means of a plurality of spring loaded rollers 62. This is necessary to prevent potatoes 15 from riding up and over slot cutter 30 as they come into engagement with it. As conveyors 60 and 61 continue to transport the potatoes forward, a slot is cut in each potato parallel to and coincident with the longitudinal axis of the whole potato as it is transported forward. The conveyor trough continues to move the potato past the slot cutter 30 and into engagement with alignment plate 32. Alignment plate 32 is sized to slide, in interfitting arrangement, into the slot in potato 15 that has just been cut by slot cutter 30. Alignment plate 32 serves to hold the potato and prevent its rotation when it is fed into engagement with cutter blade assembly 20.

As the potato 15, held by alignment plate 32, is urged forward into engagement with cutter blade assembly 20, ring cutters 24 and shear blade 25 commence cutting a plurality of concentric continuous helical spirals of cut food pieces. However, as the shear blade passes the slot previously cut in potato 15, the length of each cut piece terminates and the result is a plurality of concentric, helical, split rings of cut food pieces. The width of slot cutter 30 is much smaller than the cross sectional area of the concentric helical split ring pieces as determined by the length of ring cutters 24, the angle at which shear blade 25 is attached to wheel plate 21 and the rate at which the whole potatoes are fed into engagement with cutter blade assembly 20. This results in the cross sectional area of helical split ring cut food piece 10 being much greater than the space between the two ends of each split ring, thus precluding one split ring helical piece from interlocking into another. The result is that the french fries have the general mechanical properties, as it relates to interlocking, as that of a box full of flat washers of varying sizes.

Figure 8:
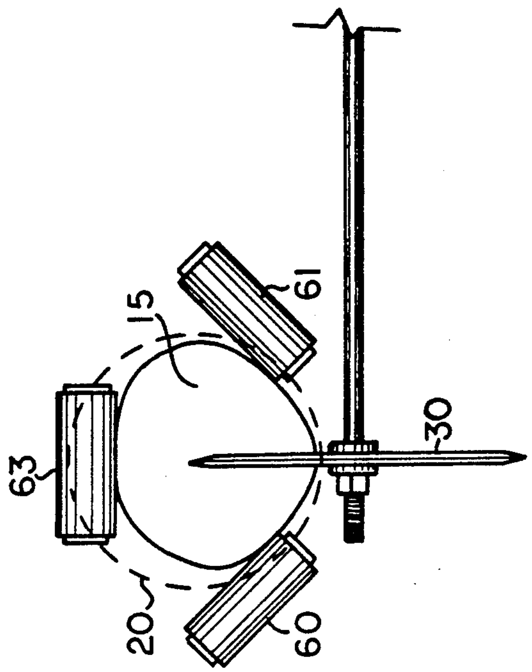
FIG. 8 is a perspective representational sectional end view of the second embodiment of the conveyor and slot cutter blade assembly.
Figure 7:
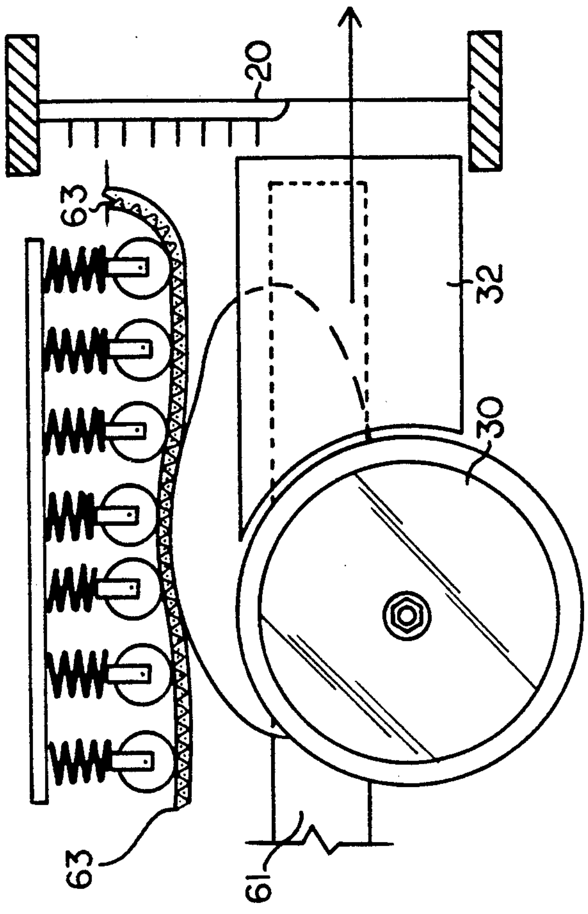
FIG. 7 is a perspective representational side view of a second embodiment of the conveyor, slot cutter blade and cutter blade assembly.

In a second embodiment, as shown in FIGS. 7 and 8, a spring loaded top conveyor belt 63 is substituted for spring loaded rollers 62.

While there is shown and described the present preferred embodiment of the invention, it is to be distinctly understood that this invention is not limited thereto but may be variously embodied to practice within the scope of the following claims.

Accordingly, what is claimed is:

1. A cut potato piece, having a uniform cross sectional area, formed in the shape of a helical split ring, wherein the distance between the ends of the cut potato piece defining the split is smaller than the cross sectional area of the cut potato piece.

* * * * *